Sheet 1 - 4 Sheets.

C. F. Jauriet.

Steam-Generator.

No. 2825 Reissued Dec 31, 1867

Richard S. Moore
W. F. Whitehouse. } Witnesses

Inventor
C. F. Jauriet

Shet 2 - 4 Shets.

C. F. Jaurret.

Steam-Generator.

No: 2825 Reissued Dec 31, 1867

Richard J. Moore } Witness
W. F. Whitehouse }

Inventor
C. F. Jaurret

Shet 3 - 4 Shets

C. F. Jauriet.

Steam-Generator.

No. 2825 Reissued Dec. 31, 1867

Richard J. Moore } Witness
W. F. Mitchell }

Inventor
C. F. Jauriet.

Sheet 4 - 4 Sheets.

C. F. Jauriet.

Steam-Generator.

No. 2825 Reissued Dec. 31, 1867

Witness
Richard S. Moore.
W. F. Whitehouse

Inventor
C. F. Jauriet

United States Patent Office.

C. F. JAURIET, OF AURORA, ILLINOIS, ASSIGNOR TO HIMSELF AND A. I. AMBLER.

*Letters Patent No.* 52,945, *dated February* 27, 1866; *reissue No.* 2,825, *dated December* 31, 1867.

DIVISION B.

IMPROVEMENT IN STEAM-GENERATORS.

The Schedule referred to in these Letters Patent and making part of the same.

TO ALL WHOM IT MAY CONCERN:

Be it known that I, C. F. JAURIET, of the city of Aurora, in the county of Kane, in the State of Illinois, have invented a new and useful Improvement in the Construction of Fire-Boxes of Steam-Generators of coal-burning engines; and I do hereby declare that the following is a full, clear, and exact description of the same, reference being had to the accompanying drawings, forming a part of this specification, in which—

Figures or diagrams A B C D E, shown in red lines, represent and illustrate a line of experiments by which I arrived at the result desired in the admission of air to the fire-box in the right quantity and place to secure the most rapid ignition of the fuel and consumption of the gases.

Similar letters of reference in the several figures indicate corresponding parts.

The nature of my invention consists in providing a water-bridge or deflector in the fire-box of a coal-burning engine, and so constructing and applying the same as to form, in combination with the crown and flue-sheets, a combustion-chamber in the fire-box; and, in combination therewith, providing suitable air-jets, so located and arranged as to admit air to the fire-box in the right quantity and place to secure the rapid ignition of the fuel, and at the same time to facilitate the combustion of the gases in the combustion-chamber. These important and distinctive features of my invention are the result of long study, continued experiments, and years of experience in coal-burning engines.

I am well aware that the conception of a water-bridge, deflector, division, or partition in a fire-box, for the purpose of affording protection to the flues, and forming a combustion-chamber, is not new or peculiar to my box, as various plans and devices have been invented for this purpose, some of which have been used and tested, but, except in the case of a division or projection, by a brick arch, I have yet to learn that the results attained have been of substantial advantage or practical utility. And in the case of the brick arch, the projection cannot be practically constructed so as to extend sufficiently far in the box to secure the advantages of a perfect combustion-chamber, in which the gases may have time to consume before entering the flues.

To enable others skilled in the art to make and use my invention, I will proceed to describe its construction and mode of operation.

Figure 1:
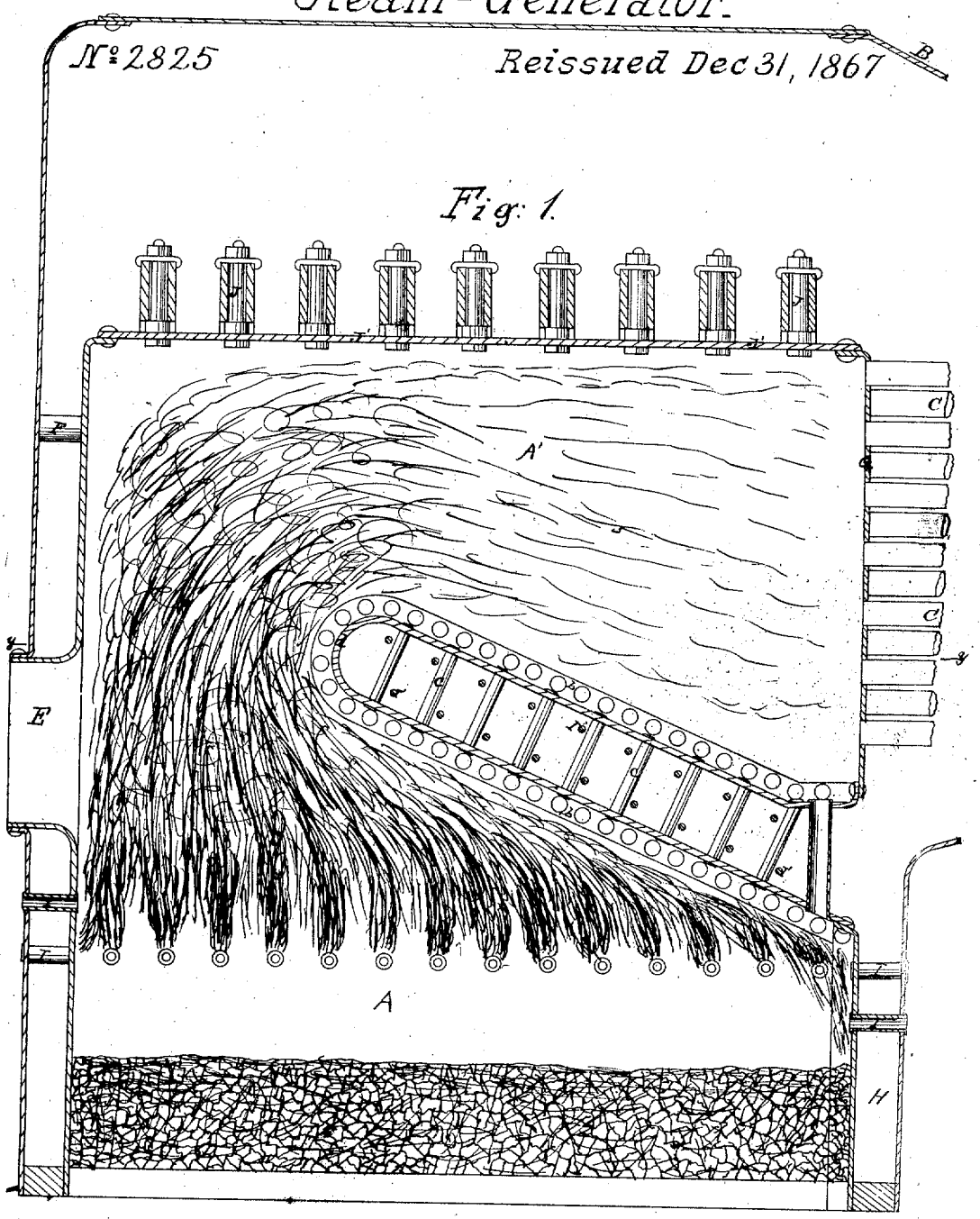
Figure 1 is a vertical longitudinal section of the fire-box and a portion of the flue-end of a coal-burning engine, showing combustion-chamber, water-bridge, and air-jets.
Figure 2:
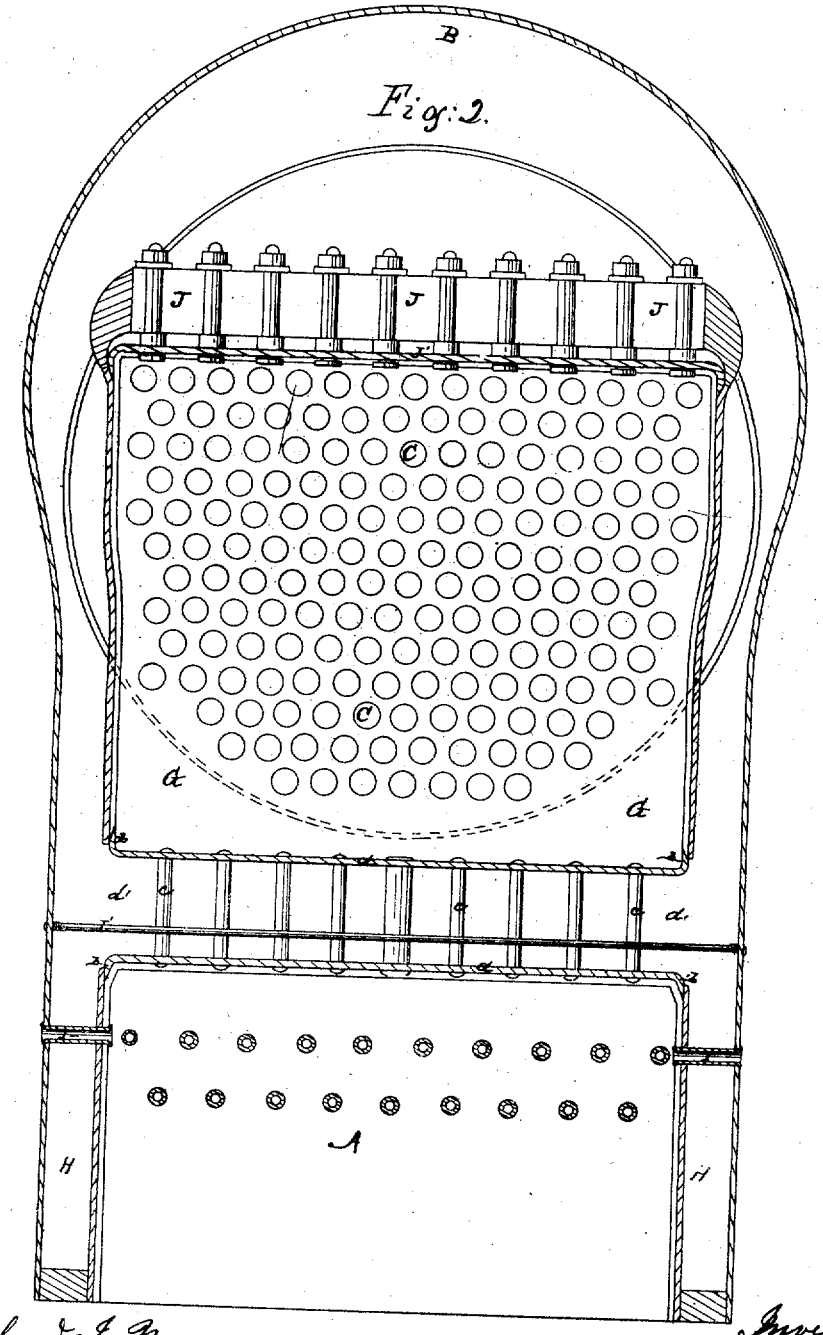
Figure 2 is a vertical transverse section of the same in line *x x* of fig. 1.
Figure 3:
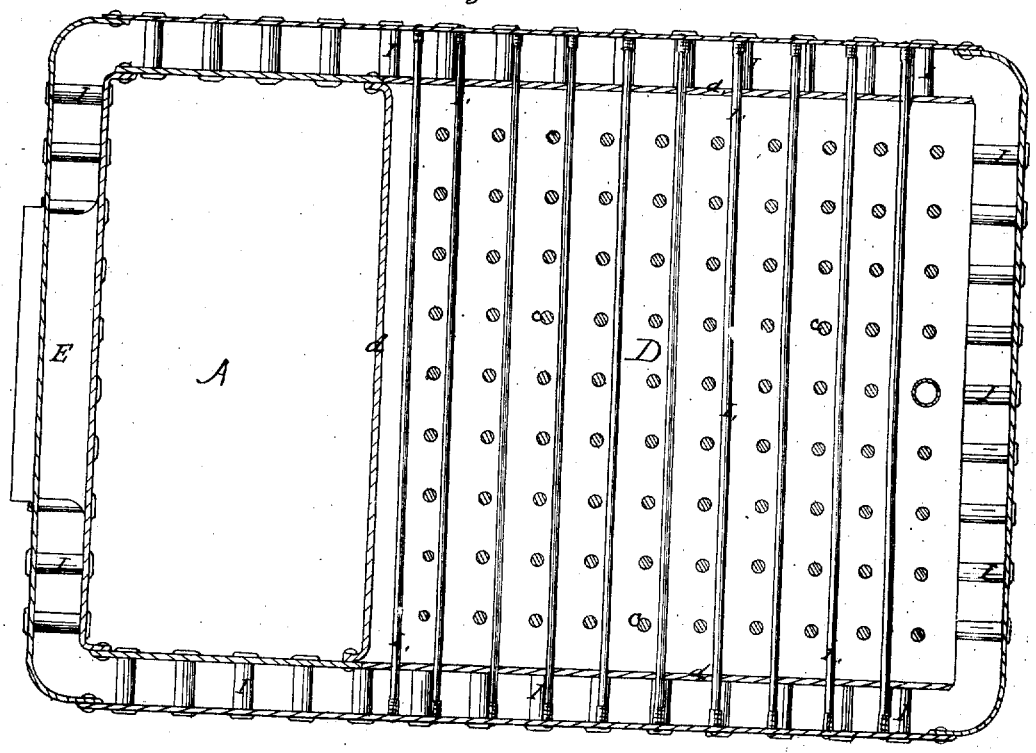
Figure 3 is a section of the fire-box with water-bridge in the line *y y* of fig. 1.
Figure 5:
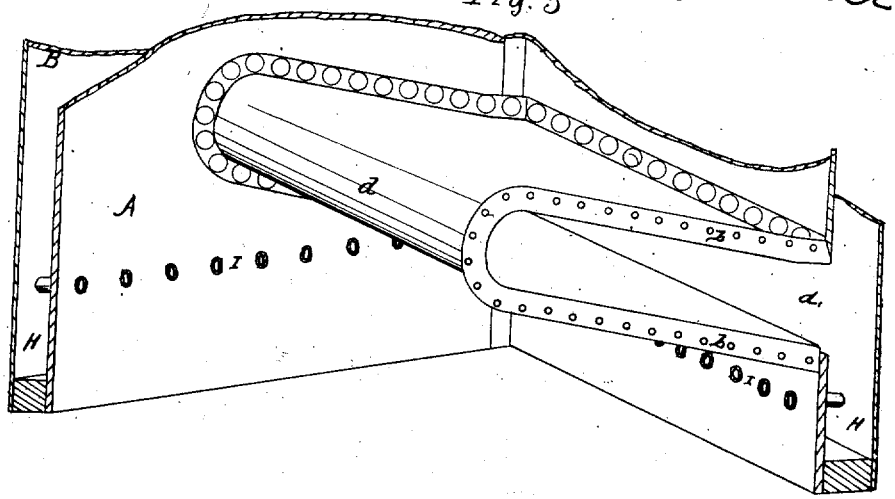
Figure 5 is a sectional perspective view of fire-box, showing the application of water-bridges and air-jets, as it appears when enclosed by the outer jacket, shown broken away and in section.
Figure 4:
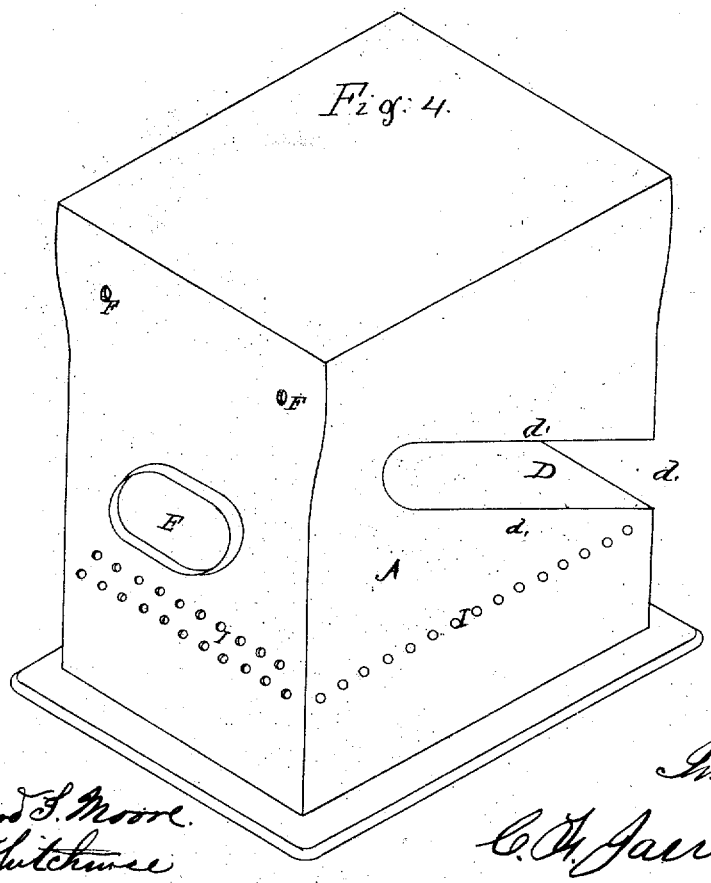
Figure 4 is a porspective view of the inner lining of the fire-box, showing the water-bridge and the holes for hollow tubes or air-jets, as it appears detached, or when not enclosed by the outer jacket of the fire-box.
Figure 4:
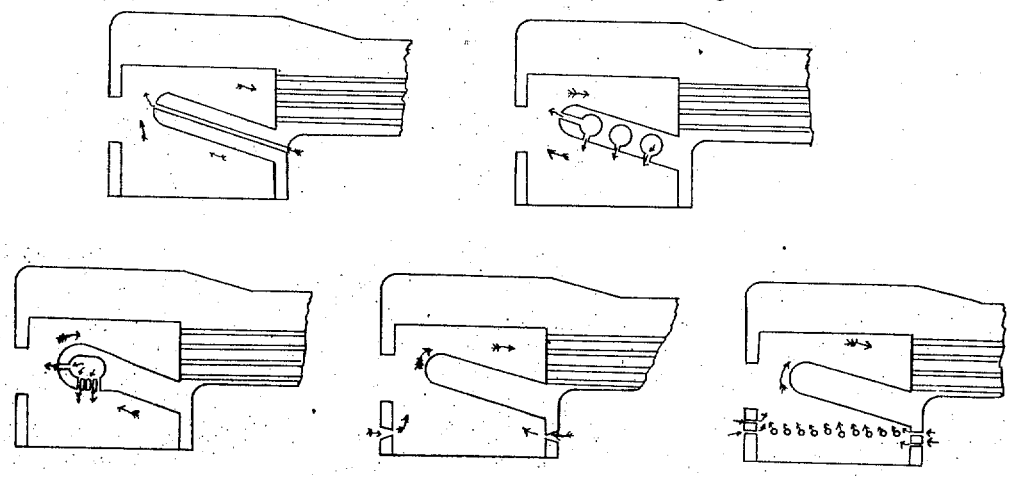

In the drawings, A represents the fire-box or furnace proper; A′, the combustion-chamber; B the boiler or outer jacket of the fire-box, and the flues C C. D is the water-bridge or deflector; E, the door through which the fuel is introduced to the box; F, the "peep-hole," through which the engineer inspects the internal condition of the fire-box; H H designate what are usually termed the "water-legs"—the water-space between the inner lining and the outer jacket of the fire-box. I I are the air-jets or tubular bolts, passing through the water-legs to admit air to the fire-box. J J are the ordinary crown-bars, which, by means of stay-bolts, as shown, support the crown-sheet of the fire-box. J′ is the crown-sheet forming the top of the fire-box and combustion-chamber; G, flue-sheet. I make my water-bridge or deflector D by taking a flat sheet of copper, or other metal suitable for this purpose, and by bending into form of a semi-tube, the sheet of metal being of sufficient size at top and bottom to give the proper length and width to the bridge to suit the size of the box to which it is to be applied, the upper and lower sides of said semi-tube being flattened so as to be on straight lines, or nearly so, from the point where they leave the curve or rounded part, *a*, of the sheet of metal which is bent. The form which I have attempted to describe is clearly shown in figs. 1, 4, and 5 of the drawings. This semi-tube thus bent has its ends and side edges turned out at right angles, so as to form bolting or riveting flanges or flanches *b b*, as shown. I thus have a water-bridge which is fully open at one end and at both sides, said opening extending to the closed end and entirely across the sheet, as represented. To stay this bridge vertically, I introduce through the upper and lower portions or parts of the sheet or bridge screw-bolts *c c*, said bolts being tapped in the sheet of which the bridge is formed. To apply the bridge to the interior of the fire-box A, I cut out of each of the side and back walls of the inner lining a piece of metal exactly corresponding in form and size with a vertical longitudinal section of the bridge, as represented at fig. 4; that is to say, corresponding with the sides and end openings of the bridge, as formed ready for application. This being done, the bridge is set in its place, which is in line with the passages *d d*, figs. 2 and 4, and securely bolted or riveted by its flanges *b b* to the inner lining of the side and back walls, both above and below, as represented. In order to tie the outer jacket or walls together, and thus strengthen the same when the inner lining is cut away and the bridge is applied, I pass through stay-bolts I′ I′, from one side to the other, as represented and clearly shown in the drawings. The tubular stay-bolts I′ I′ are tapped in and riveted both on the outside and inside of the fire-box, passing through the water-space or water-legs, as clearly shown in the drawings, at the place indicated. Thus it will be seen that I obtain a perfectly safe, durable, and practical water-bridge or deflector in the fire-box of a coal-burning engine, and by means of which I form a combustion-chamber for the consumption of the gases; and in combination with the air-jets I I, for the admission of air to the fire-box, I am enabled to secure the most desirable results in the consumption and economy of fuel in a coal-burning engine.

Fire being built in the fire-box and the coal heated, the draught will enter at the air-jets so near the fire as to cause the fuel to ignite rapidly and burn freely, and, as the heat and flame ascend to the water-bridge or deflector, it is caused to whirl and reverberate in circles and eddies as it passes around the deflector and into the combustion-chamber, (see fig. 1,) and here it remains in these eddying, whirling, and reverberating currents until forced by the draught to enter the flues, before which, however, time has been given to greatly assist in the combustion of the gases in the combustion-chamber, the effect of which is, as stated, to economize fuel, destroy the smoke and cinders, and afford additional heating-surface, and a corresponding amount of power and capacity to the engine.

My invention is applicable to all coal-burning engines; but, when applied to other than locomotive-engines, a fan-blower may be required to convey air by means of suitable pipes, tubes, or conduits, to the fire-box, to facilitate the draught by means of the air-jets.

I disclaim air-jets, as such, as they have long been known and used for the admission of air to the fire-box in other distinctive forms and combinations, but What I do claim as new, and desire to secure by Letters Patent, is—

A coal-burning locomotive constructed with the following elements, viz, a water-bridge constructed and applied substantially as shown, and with a series of air-jets, I I, through the several sides of the fire-box, located and limited in their location around the fire-box above the fire, and below the water-bridge, substantially as shown.

C. F. JAURIET.

Witnesses:
RICH'D I. MOORE,
W. F. WHITEHOUSE.